(12) United States Patent
Torkelson et al.

(10) Patent No.: US 10,618,991 B2
(45) Date of Patent: Apr. 14, 2020

(54) REPROCESSABLE CROSS-LINKED NETWORK POLYMERS WITH ALKOXYAMINE DYNAMIC COVALENT BONDS

(71) Applicant: Northwestern University, Evanston, IL (US)

(72) Inventors: John M. Torkelson, Skokie, IL (US); Kailong Jin, Evanston, IL (US); Lingqiao Li, Evanston, IL (US)

(73) Assignee: NORTHWESTERN UNIVERSITY, Evanston, IL (US)

(*) Notice: Subject to any disclaimer, the term of this patent is extended or adjusted under 35 U.S.C. 154(b) by 312 days.

(21) Appl. No.: 15/274,619

(22) Filed: Sep. 23, 2016

(65) Prior Publication Data

US 2017/0081449 A1 Mar. 23, 2017

Related U.S. Application Data

(60) Provisional application No. 62/222,568, filed on Sep. 23, 2015.

(51) Int. Cl.
*C08F 212/08* (2006.01)
*C08F 220/18* (2006.01)
*C08F 220/36* (2006.01)
*C08F 236/10* (2006.01)
*C08J 11/06* (2006.01)

(52) U.S. Cl.
CPC .......... *C08F 220/18* (2013.01); *C08F 212/08* (2013.01); *C08F 220/36* (2013.01); *C08F 236/10* (2013.01); *C08J 11/06* (2013.01); *C08F 2438/02* (2013.01); *C08F 2800/20* (2013.01); *C08F 2810/20* (2013.01); *C08J 2333/08* (2013.01)

(58) Field of Classification Search
CPC .... C08F 220/18; C08F 236/10; C08F 220/36; C08F 212/08; C08F 2810/20; C08F 2800/20; C08F 2438/02; C08J 11/06; C08J 2333/08
See application file for complete search history.

(56) References Cited

U.S. PATENT DOCUMENTS

| 6,509,428 B1 | 1/2003 | Senninger et al. |
| 6,803,438 B1 * | 10/2004 | Brocchini ............... C08F 20/34 526/204 |
| 2002/0040117 A1 | 4/2002 | Guerret et al. |
| 2007/0123669 A1 | 5/2007 | Charleux et al. |

OTHER PUBLICATIONS

Li et al., "Nitroxide-mediated Polymerization of Styrene in the Presence of a Novel Trinitroxide", e-Polymers, 2010, No. 145, pp. 1-11.*
Zhao, "Amphiphilic Polymeric Conetworks Prepared by Controlled Radical Polymerization Using a Nitroxide Cross-linker", Journal of Polymer Science: Part A: Polymer Chemistry, 2010, vol. 48, pp. 4141-4149.*
Otsuka H., "Reorganization of polymer structures based on dynamic covalent chemistry: polymer reactions by dynamic covalent exchanges of alkoxyamine units", Polym. J., 2013, 45, 879-891.
Yuan C. et al., "Self-Healing of Polymers via Synchronous Covalent Bond Fission/Radical Recombination", Chem. Mater., 2011, 23, 5076-5081.
Yuan C. et al., "Application of alkoxyamine in self-healing of epoxy" J. Mater. Chem. A., 2014, 2, 6558-6566.
Yang Y. et al., "Chemical and physical aspects of self-healing materials", Prog. Polym. Sci. 2015.
Kloxin, C.J. et al., "Covalent adaptable networks: smart, reconfigurable and responsive net work systems", Chem. Soc. Rev., 2013, 42, 7161-7173.
Liu Y. et al., "Self-healing polymers based on thermally reversible Diels-Alder chemistry", Polym Chem. 2013, 4, 2194-2205.
Amamoto, Yoshifumi et al., "Reorganizable chemical polymer gels based on dynamic covalent exchange and controlled monomer insertion", Macromolecules, vol. 42, No. 22, 2009, 8733-8738.
Jin, Kailong et al., "Recyclable crosslinked polymer networks via one-Step controlled radical polymerization", Advanced Materials, vol. 28, Iss. 31, May 20, 2016, 6746-6750.
International Search Report and Written Opinion for PCT/US2016/053450 dated Jan. 6, 2017, 12 pages.

* cited by examiner

*Primary Examiner* — Patrick D Niland
(74) *Attorney, Agent, or Firm* — Bell & Manning, LLC (57) ABSTRACT

Reorganizable or reprocessable cross-linked polymer networks with alkoxyamine dynamic covalent bonds and methods for preparation.

21 Claims, 5 Drawing Sheets

REPROCESSABLE CROSS-LINKED NETWORK POLYMERS WITH ALKOXYAMINE DYNAMIC COVALENT BONDS

This application claims priority to and the benefit of application Ser. No. 62/222,568 filed Sep. 23, 2015—the entirety of which is incorporated herein by reference.

BACKGROUND OF THE INVENTION

Covalently cross-linked polymers, commonly referred to as thermosets, are widely used in applications ranging from automobile, truck and tractor tires to high technology aerospace materials. Because such conventional cross-linked polymers have strong covalent bonds which result in fixed, covalent networks of chains, it is not possible to change the shape or molecular structure of such materials after curing (or "setting"). Thus, unlike thermoplastic polymers, which can be reprocessed in the melt state, conventional thermoset polymers cannot be remelted and recycled for high-value use. For example, recycling of cross-linked rubber tires has been a major unmet need in the art.

Over the last decade, attempts have been made to incorporate reversible covalent bonds into polymers whose primary structures, properties, and even shapes can then be changed through molecular reversible rearrangement reactions in response to an external or environmental stimulus. A variety of different chemistries and resulting reversible covalent bonds have been considered, including reversible cycloaddition reactions (e.g., Diels-Alder reactions), exchange reactions (e.g., transesterification reactions, disulfide exchange reactions, siloxane exchange reactions) and other stable free radical mediated reshuffling reactions (e.g., addition-fragmentation reactions of trithiocarbonates and allyl sulfide). All have met with limited practical utility. More specifically, previous studies on reprocessable cross-linked polymers have shown such systems typically require complicated monomer synthesis and/or addition of small molecular components to introduce reprocessability. Furthermore, all such prior art reactions require multiple synthetic steps.

Alternatively, nitroxide-mediated polymerization (NMP) has been investigated. For instance, using 2,2,6,6-tetramethyl-1-piperidinyloxy (TEMPO), resulting alkoxyamine-based dynamic covalent bonds can maintain an equilibrium between radicals and dormant species through bond dissociation and recombination under proper conditions. In the context of hydrogel synthesis, it was demonstrated in the literature that alkoxyamine units possess the reversibility in polymer networks by decross-linking the cross-linked polymers with these dynamic covalent bonds incorporated using small molecules that also contain alkoxyamine bonds. However, polymer network synthesis was based on low temperature polymerization to protect the alkoxyamine bonds during the reaction, and gelation was induced by either pre-synthesized divinyl cross-linkers or post-polymerization treatments. In another reported study, polymer synthesis was unduly complicated and the resulting materials were lacking in application value. Accordingly, the reprocessing of cross-linked thermoset polymers remains an ongoing concern in the art. The search continues for a practical, effective approach to the synthesis and recycling of such materials.

SUMMARY OF THE INVENTION

In light of the foregoing, it is an object of the present invention to provide various cross-linked thermoset polymers and/or methods for their production and/or recycling, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide polymeric materials having incorporated therein one or more reversible covalent bonds, such materials and corresponding molecular structures as can be modified through reversible rearrangement reactions in response to external stimuli.

It can also be an object of the present invention to provide such cross-linked polymeric materials without complicated monomer synthesis typical of the prior art.

It can also be an object of the present invention, alone or in conjunction with one or more of the preceding objectives, to utilize nitroxide-mediated polymerization as a practical approach to the preparation and recycling of cross-linked polymeric materials.

Other objects, features, benefits and advantages of the present invention will be apparent from this summary and its descriptions of various preferred embodiments, and will be readily apparent to those skilled in the art having knowledge of various reprocessable cross-linked polymers and their synthesis. Such objects, features, benefits and advantages will be apparent from the above as taken into conjunction with the accompanying examples, data, figures and all reasonable inferences to be drawn therefrom.

In part, the present invention can be directed to a polymeric material or network comprising the polymerization product of at least one reactant monomeric component comprising at least one carbon-carbon double bond amenable to, capable of or as can undergo free radical polymerization; a multifunctional radical initiator component; and a nitroxide monomeric component comprising a moiety selected from at least one carbon-carbon double bond, at least another nitroxide moiety and combinations thereof, such a polymerization product as can comprise cross-links comprising one or more reversible alkoxyamine covalent bonds. In certain non-limiting embodiments, such a reactant monomeric component can be of a formula $R_1R_2CCR_3R_4$, wherein each of $R_1$-$R_4$ can be, without limitation, independently selected from hydrogen, halo, alkyl, haloalkyl, aryl, substituted aryl, arylalkyl, substituted arylalkyl, alkenyl, haloalkenyl, arylalkenyl, substituted arylalkenyl, alkoxycarbonyl and alkylaminecarbonyl moieties. For instance, such a reactant monomeric component can be a polymer or copolymer, synthesized by any means, that contains at least one carbon-carbon double bond amenable to radical polymerization. Without limitation, such polymers can include polybutadiene and polyisoprene, which contain many such double bonds, or macromers that contain a single carbon-carbon double bond. Such copolymers can, without limitation, include styrene-butadiene and styrene-isoprene copolymers. In certain other non-limiting embodiments, such a reactant monomeric component can be of a formula $CH_2CHR_1$, wherein $R_1$ can be selected from moieties of the sort discussed above, illustrated below or as would otherwise be understood by those skilled in the art made aware of this invention. As illustrated below, such a monomeric component can be an arylethylene. Regardless, in certain other embodiments, such a polymeric material can comprise another such reactant monomeric component comprising at least one carbon-carbon double bond, to provide a copolymerization product. Without limitation, in certain such embodiments, such another monomeric component can be an alkylacrylate.

Without limitation, in certain embodiments, such a multifunctional radical initiator component can be selected from peroxy compounds of the sort understood by those skilled in the art and made aware of this invention, including but not limited to bis-alkylperoxyalkyl and cycloalkyl compounds and combinations thereof Alternatively, such a multifunctional radical initiator component can be selected from azo compounds and other compounds as would be understood by those skilled in the art made aware of this invention that can initiate radical polymerization, such compounds including but not limited to cycloazo compounds. Alternatively, a mixture of radical initiator components can be utilized to provide multiple radical moieties, such a mixture as can comprise one or more monofunctional, one or more bifunctional or one or more multifunctional radical initiator components, or combinations thereof.

Likewise, in certain embodiments, regardless of reactant monomeric and/or initiator component(s), such a nitroxide component can be selected from nitroxide compounds comprising at least one carbon-carbon double bond, such compounds of the sort understood by those skilled in the art and made aware of this invention, including but not limited to olefinic aminoxyl and heterocyclyloxy compounds and combinations thereof. In certain other embodiments, such a nitroxide component can have one or more additional nitroxide moieties, such a component including but not limited to 2,4,6-tri(4'-oxy-2',2',6',6'-tetramethyl-1'-piperidinyloxy)-1,3,5-triazine. Alternatively, in certain other embodiments, the present invention can utilize a unimolecular initiator component to provide both a multifunctional radical component and a nitroxide monomeric component. Without limitation, such a unimolecular initiator can be 1,4-bis(1'-(4"-acryloyloxy-2",2",6",6"-tetramethylpiperidinyloxy)ethyl)benzene.

In part, the present invention can also be directed to a crosslinked polyvinyl compound comprising a first vinyl monomeric component selected from at least one monomer of a formula $CH_2CHR_1$, wherein $R_1$ can be, without limitation, selected from halo, alkyl, haloalkyl, aryl, substituted aryl, arylalkyl, substituted arylalkyl, alkoxycarbonyl and alkylaminecarbonyl moieties; a bi-functional radical component; and a nitroxide monomeric component comprising a carbon-carbon double bond moiety, such cross-links comprising such precursor and nitroxide monomeric components and a reversible alkoxyamine covalent bond. In certain non-limiting embodiments, such a first vinyl monomeric component can be an arylethylene, where $R_1$ is an aryl moiety. In certain such embodiments, such a first monomeric component can be styrene, where $R_1$ is phenyl. In certain other non-limiting embodiments, such a cross-linked polyvinyl compound can comprise a second vinyl monomeric component selected from at least one monomer of a formula $CH_2CHR_2$, wherein $R_2$ can be independently and without limitation selected from moieties of the sort described above or illustrated elsewhere herein. In certain such embodiments, such a second vinyl monomeric component can be an alkylacrylate, where $R_2$ can be an alkoxycarbonyl moiety. As illustrated below, such a second vinyl monomeric component can be n-butyl acrylate, where $R_2$ is n-butoxycarbonyl.

Regardless, such a cross-linked polyvinyl compound can comprise a bi-functional radical component of the sort discussed above or illustrated elsewhere herein. Without limitation, such a radical component can be a peroxy degradation product of a precursor component such as but not limited to 1,1-bis(tert-butylperoxy)cyclohexane. Likewise, without regard to the identity of any first or second vinyl monomeric component, such a polyvinyl compound can comprise a nitroxide component of the sort described above or illustrated elsewhere herein. Without limitation, such a nitroxide component can be 2,2,6,6-tetramethyl-1-piperidinyloxy. In certain such embodiments, such a cross-linked polyvinyl compound can comprise a styrene first monomeric component and an n-butyl acrylate (nBA) second monomeric component.

In part, the present invention can also be directed to a cross-linked polyvinyl compound comprising a nitroxide-mediated polymerization product of a first reactant monomeric component of the sort discussed above or illustrated elsewhere herein comprising at least one carbon-carbon double bond amenable to, capable of or as can undergo radical polymerization; a second monomeric component chemically distinct from such a first monomeric component and comprising at least one carbon-carbon double bond amenable to, capable of or as can undergo radical polymerization; a bi-functional radical component and a nitroxide component comprising a carbon-carbon double bond, such a compound as can comprise reversible alkoxyamine covalent bonds. Without limitation, in certain embodiments, such a polyvinyl compound can comprise a styrene first monomeric component and an n-butyl acrylate second monomeric component. In certain such embodiments, a bi-radical component can provide the peroxy degradation product of 1,1-bis(tert-butylperoxy)cyclohexane, and a nitroxide component can be 2,2,6,6-tetrmethyl-1-piperidinyloxy.

In part, the present invention can also be directed to a one-step method of preparing a polyvinyl network comprising reversible alkoxyamine bonded crosslinks. Such a method can comprise reacting a mixture of at least one reactant monomeric component of the sort discussed above or illustrated elsewhere herein comprising at least one carbon-carbon double bond amenable to, capable of or as can undergo radical polymerization, a multifunctional radical initiator precursor component and a nitroxide monomeric component comprising a carbon-carbon double bond moiety (or multiple nitroxide moieties) at a temperature at least partially sufficient to provide a multifunctional radical component, initiate polymerization and form reversible alkoxyamine covalently-bonded polymer cross-links, such a polyvinyl network as can be prepared in one reaction. Alternatively, rather than using thermal initiation, such a reacting mixture can be initiated by photo-initiation or other means known to those skilled in the art and made aware of this invention.

In certain non-limiting embodiments, such a monomeric component can be of a formula $CH_2CHR$, wherein R can, without limitation, be selected from moieties of the sort discussed above or illustrated elsewhere herein. In certain other embodiments, such a mixture can comprise another such reactant monomeric component, to provide a copolymerization product including but not limited to styrene-nBA, styrene-butadiene, and styrene-isoprene copolymer. Regardless, multifunctional radical initiator precursor and nitroxide monomeric components can be of the sort discussed above or illustrated elsewhere herein. Likewise, without regard to precursor or nitroxide component identity, modulating the concentration of at least one such component can change the density of the crosslinks of such a polyvinyl network.

As illustrated below, in the context of certain embodiments, post-reaction application of an extraneous stimulus can reverse and rearrange cross-link alkoxyamine bonds. In accordance therewith, such a polyvinyl network can be reprocessed and/or recycled.

In part, the present invention can also be directed to a one-step method of using a nitroxide compound to modulate crosslinkage of a polyvinyl compound. Such a method can comprise reacting a mixture of at least one reactant monomeric component of the sort discussed above or illustrated elsewhere herein comprising at least one carbon-carbon double bond amenable to, capable of or as can undergo radical polymerization, a multifunctional radical initiator precursor component and a nitroxide monomeric component comprising a carbon-carbon double bond moiety (or multiple nitroxide moieties) at a temperature at least partially sufficient to provide a bi-functional radical component, initiate radical polymerization and form reversible alkoxyamine covalently-bonded polymeric cross-links, such a polyvinyl compound as can be prepared in one reaction. In certain embodiments, such a mixture can comprise a styrene first monomeric component and an nBA second monomeric component. Regardless, such a mixture can comprise a 1,1-bis(tert-butylperoxy)cyclohexane precursor component and a 2,2,6,6-tetramethyl-1-piperidinyloxy nitroxide component.

In part, the present invention can be directed to a method of using controlled radical polymerization to prepare a reprocessible cross-linked polyvinyl compound. Such a method can comprise reacting a first vinyl monomeric component selected from at least one monomer of a formula $CH_2CHR_1$; a second monomeric component selected from at least one monomer of a formula $CH_2CHR_2$, where $R_1$ and $R_2$ can be independently selected from moieties of the sort described above or illustrated elsewhere herein, a bi-functional radical precursor component and a nitroxide component comprising a carbon-carbon double bond moiety, such a polyvinyl compound prepared in one reaction absent the presence of another component to promote reprocessibility. Without limitation, such first and second vinyl monomeric components, and bi-functional radical precursor and nitroxide components, can be of the sort discussed above or illustrated elsewhere herein. Regardless, modulating the concentration of at least one such nitroxide and radical precursor components can affect the density of resulting cross-links of such a polyvinyl compound. Post-reaction application of an extraneous stimulus can reverse and/or rearrange the alkoxyamine bonds of such cross-linkages, to promote reprocessibility of such a polyvinyl compound.

DETAILED DESCRIPTION OF CERTAIN EMBODIMENTS

As relates to certain embodiments, this invention provides a strategy of designing and preparing cross-linked network polymers containing alkoxyamine bonds. Such a strategy allows robust and simple chemistry that combines both nitroxide mediated polymerization (NMP) and network formation in a 'one-step' bulk reaction. Resulting materials possess both the stability of covalently cross-linked network polymers and the capability of reprocessing or self-healing through molecular reversible rearrangement reactions of the alkoxyamine units in response to an external or environmental stimulus. The dynamic alkoxyamine cross-links allow for reprocessing through repeated bond formation and dissociation. Although vinyl-based elastomeric materials are chosen as the focus of the particular example described here, the strategy can be readily applied to any monomer or polymer having a carbon-carbon double bond amenable to radical polymerization, regardless of functionalization, to produce other reprocessable cross-linked polymers for many other applications. Without limitation, a polymer network can be prepared using polybutadiene and styrene as a model for recyclable tires—showing good reproducibility and uniformity and property recovery after multiple reprocessing/recycling steps.

Figure 5:
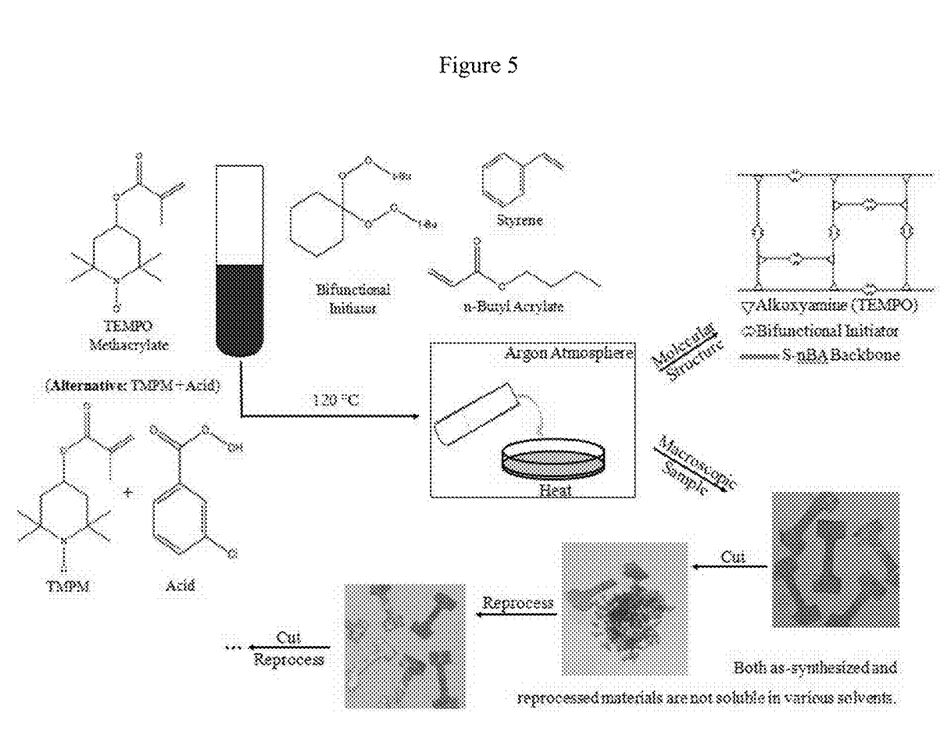

Such an approach allows effective bulk polymerization at high temperature and avoids complicated synthetic routines. A combination of multifunctional radical initiators and nitroxide-based monomers with another suitable functionality (e.g., carbon-carbon double bond), which act as both radical regulators during the polymerization, and dynamic covalent crosslinks endow the system reversibility through robust 'one-step' chemistry as shown in FIG. 5. As an example, 2,2,6,6-tetramethyl-1-piperidinyloxy (TEMPO) methacrylate is presented as the cross-linker in the vinylic polymer network, and a bifunctional initiator precursor, 1,1-bis(tert-butylperoxy)cyclohexane, is used to generate chains to connect those TEMPO cross-linkers together. TEMPO methacrylate remains active as radical regulator during bulk reaction, and polymerization proceeds in a pseudo-living manner till gelation. During polymerization, due to the statistical dissociation of C—O—N bond and monomer addition, the reacting system grows uniformly leading to superior mechanical properties of the final cross-linked materials. The formed network possesses a 3-arms cross-link topology with statistically uniform long chains between cross-links attributed to the NMP chemistry, which is distinctly different from the network formed by conventional divinyl cross-linkers reported previously in the literature. Given the expense of high purity TEMPO methacrylate, a cost-effective alternative is available through oxidation of 2,2,6,6-tetramethyl-4-piperidyl methacrylate by 3-chloroperbenzoic acid, as shown in FIG. 5, with the result that similar material can be obtained with the cost significantly reduced.

This invention also provides comprehensive tunability in material properties. Given that all monomers or polymers capable of NMP, regardless of functionalization, can be considered in this strategy, changing the type, composition or feed ratios of the reagents or monomers/polymers in the reaction would effectively lead to the tunability of the glass transition temperature, $T_g$ without affecting reprocessability of the resulting network. Moreover, adjustment in cross-link density can be achieved through tuning the concentrations of initiators and/or alkoxyamines. Different alkoxyamines might be applied to optimize the reprocessing conditions, and functionalities of both alkoxyamine and initiator can be changed if a different network topology is needed. For example, the TEMPO radical can be substituted with other nitroxide species, such as 2,2,5-trimethyl-4-2(2-pyridyl)-3-azahexane-3-nitroxide, which can undergo reaction at different temperature ranges. As a result, the reprocessing temperature for the network can be tuned.

Figure 1A:
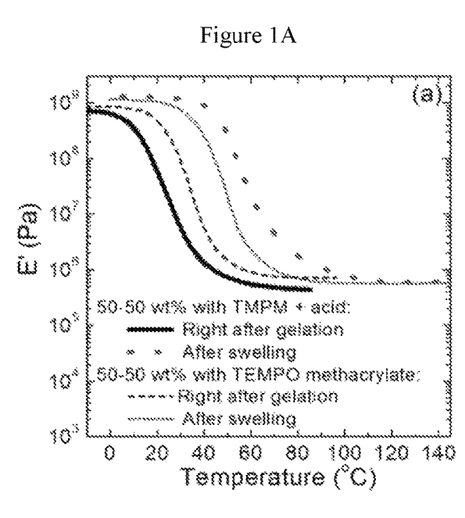
FIGS. 1A-B. (A) Elastic modulus, E', and (B) damping ratio, tan δ, as a function of temperature for both 50-50 wt % styrene-nBA crosslinked polymer with TMPM+acid and TEMPO methacrylate before and after swelling.
Figure 1B:
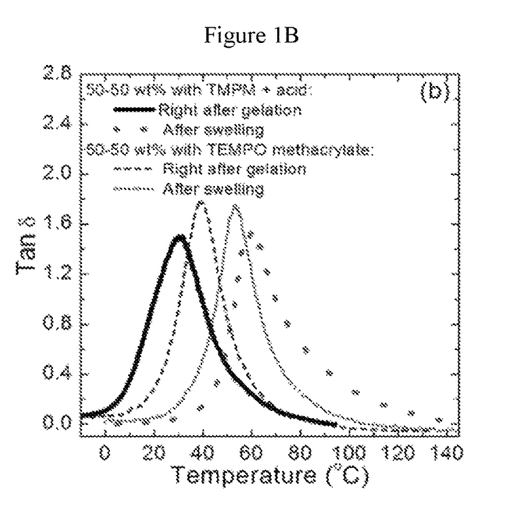

Comparison of materials synthesized with high purity TEMPO methacrylate and those with TMPM+Acid. Both high purity TEMPO methacrylate and its alternative substituent obtained from TMPM+acid have been successfully used to create cross-linked polymer networks as suggested by their insolubility in a range of different solvents, including good solvents (e.g., toluene and THF) for the linear styrene-nBA copolymers. The cross-linking of the system can also be confirmed with DMA analysis. FIG. 1, below, shows the elastic modulus, E', and damping ratio, tan δ, as a function of temperature for both 50-50 wt % styrene-nBA cross-linked polymer synthesized with both TMPM+acid and TEMPO methacrylate before and after swelling. As is shown in FIG. 1A, E' values exhibit a plateau at higher temperatures for all the tested samples, indicative of covalently cross-linked networks. Similar plateau modulus is observed for both samples synthesized with TMPM+acid and TEMPO methacrylate, indicating that similar cross-link density levels can be achieved by these two different approaches under the same feeding conditions. (The cross-link density of the polymer network can be easily adjusted by changing the concentration of initiators and alkoxyamines in the monomer mixture, with higher concentration resulting in higher cross-link density.) The plateau modulus value shows little change after swelling, which suggests that the existence of the sol fraction in the network has little effect on the cross-link density of the system. The slightly lower $T_g$ of the sample synthesized using TMPM+acid compared to that using TEMPO methacrylate right after gelation as shown in FIG. 1B could be due to the plasticizer effect of the left small acid molecules in the system. For cross-linked materials synthesized by these two approaches, there is an increase in $T_g$ after swelling, which is reasonable since the sol fraction in the system has higher mobility than the network and can plasticize the system thus lower the $T_g$. From FIG. 1B, all the samples have relatively large damping ratio (tan δ) values around $T_g$, which could be attributed to the uniformity of the network produced via NMP chemistry. A comparison between the materials produced by these two different approaches (using TMPM+acid vs. using TEMPO methacrylate) shows that they can result in network polymers with similar molecular structures and mechanical properties under the same feeding conditions while the approach using TMPM+acid costs much less and has greater potential for industrial scale-up.

Figure 2A:
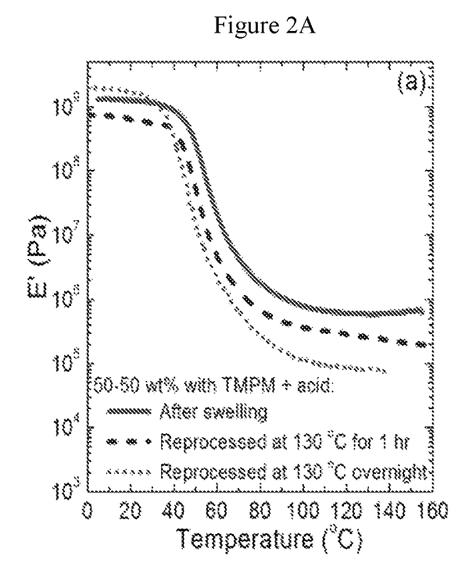
FIGS. 2A-B. (A) Elastic modulus, E', and (B) damping ratio, tan δ, as a function of temperature for 50-50 wt % styrene-nBA crosslinked polymer with TMPM+acid after swelling, after reprocessing at 130° C. for 1 hr and overnight.
Figure 2B:
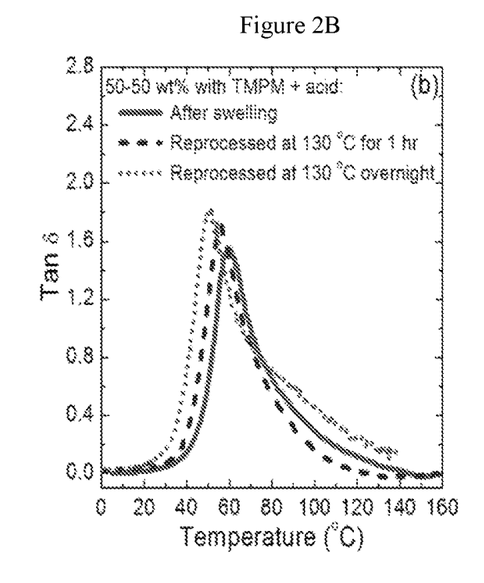

Demonstration of reprocessability of the synthesized cross-linked polymer. A test of the reprocessability of a representative cross-linked polymer with alkoxyamine dynamic covalent bonds was performed on a sample of 50-50 wt % styrene-nBA cross-linked polymer synthesized with TMPM+acid after swelling. After the removal of the sol fraction in the system, any shape change or healing of the sample during reprocessing should be only caused by the bond rearrangement through dissociation and recombination of the alkoxyamine units incorporated into the network. FIGS. 2A-B show, respectively, E' and tan δ as a function of temperature for the as-synthesized sample after swelling, after reprocessing at 130° C. for 1 hr and overnight, respectively. The existence of the elastic modulus plateau in all these samples indicates that the system remains covalently cross-linked after reprocessing at 130° C. for different amounts of time. The rubbery plateau value of the elastic modulus decreases with increasing reprocessing time at 130° C., which suggests that the cross-link density of the system would decrease after reprocessing under such conditions. The decrease in cross-link density could be due to the fact that some of the TEMPO radicals could be surrounded by the oxygen when exposed to air during reprocessing and cannot serve as efficient cross-links anymore. The decreased cross-link density of the network polymer could explain the slight decrease in $T_g$ of the system after reprocessing. (Reprocessing temperature and time could be optimized for the system to avoid substantial decrease in cross-link density, e.g., lower reprocessing temperature and longer reprocessing time can be used to obtain recycled samples with no significant decrease in cross-link density.) The sample of 50-50 wt % styrene-nBA cross-linked polymer synthesized with TMPM+acid before swelling can also be reprocessed at 130° C. for an even shorter amount of time, indicating the sol fraction in the system can enhance the mobility to facilitate the bond rearrangements during reprocessing.

Figure 3A:
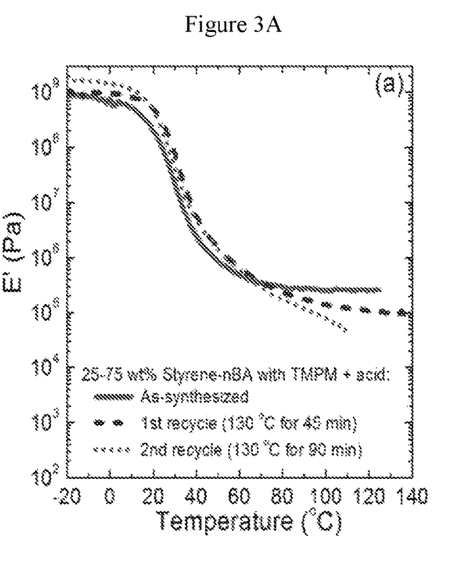
FIGS. 3A-B. (A) Elastic modulus, E', and (B) damping ratio, tan δ, as a function of temperature for as-synthesized, first recycle, and second recycled 25-75 wt % styrene-nBA crosslinked polymer synthesized with TMPM+acid.
Figure 3B:
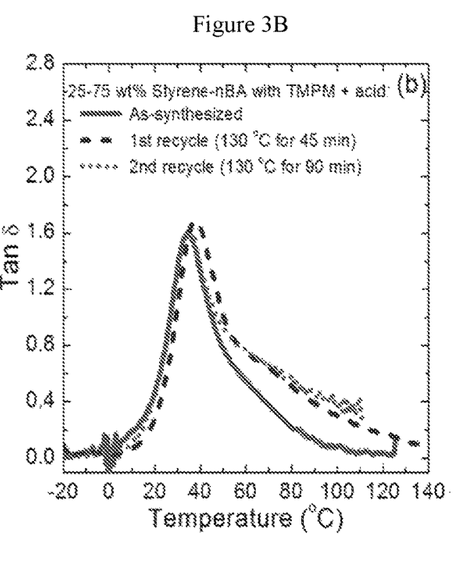

Thermal and mechanical properties of as-synthesized and recycled cross-linked elastomers. As is discussed above, as-synthesized cross-linked materials can be readily reprocessed with the sol fraction left in the system, which can actually enhance the chain mobility during the reprocessing. The reprocessing of the as-synthesized 25-75 wt % styrene-nBA cross-linked polymer synthesized with TMPM+acid was performed at 130° C. without additional swelling. FIGS. 3A-B show, respectively, E' and tan δ as a function of temperature for as-synthesized, first recycle, and second recycle 25-75 wt % styrene-nBA cross-linked polymer with TMPM+acid. Similarly, a decrease in elastic modulus plateau value is observed for the recycled materials compared to the as-synthesized samples, indicating that the cross-link density of the network system is decreased with increasing reprocessing cycles at 130° C. According to FIG. 3b, the reprocessing has limited or little effect on the $T_g$ of the system.

Tensile tests of both as-synthesized and recycled materials were performed in order to characterize the mechanical property change after reprocessing and thus determine the recovery efficiency or self-healing ability (here, defined as the percentage of a specific mechanical property value after reprocessing normalized to that of the as-synthesized sample). All tested samples show elastomeric behavior with no yield point observed before sample break. As summarized in Table 1, mechanical properties of the specimen, including modulus, elongation at break, and tensile strength, can be repeatedly restored. Little modulus loss of the material is observed even after recycling the sample for three times. (Within experimental error, the modulus is identical in the as-synthesized material and after the 3rd recycle.) For elongation at break, the 1st recycle material shows the same value within experimental error as the as-synthesized material, while the 2nd and 3rd recycle materials have a recovery efficiency of at least 70%. For tensile strength, at least 70% of the recovery efficiency is observed for the 3rd recycle material ignoring the large error associated with the experimental value of the as-synthesized material. (Taking into account the experimental error (plus/minus standard deviation of seven measurements), tensile strength is the same in the as-synthesized and 3rd recycle material.) Thus, the cross-linked elastomers with alkoxyamine dynamic covalent bond produced by the chemistry described in this invention can be recycled and reprocessed multiple times without major loss in the robust, as-synthesized mechanical properties.

TABLE 1

Tensile properties at ambient temperature for as-synthesized and recycled 25-75 wt % styrene-nBA cross-linked polymer synthesized with TMPM + acid.

| 25-75 wt % styrene-nBA | As-synthesized | 1st recycle | 2nd recycle | 3rd recycle |
| --- | --- | --- | --- | --- |
| Modulus (MPa) | 90 (±16) | 87 (±22) | 85 (±15) | 86 (±10) |
| Elongation at break (%) | 183 (±22) | 160 (±41) | 134 (±19) | 132 (±9) |
| Tensile strength (MPa) | 3.6 (±0.8) | 2.6 (±0.3) | 2.3 (±0.5) | 2.6 (±0.5) |

EXAMPLES OF THE INVENTION

The following non-limiting examples and data illustrate various aspects and features relating to the polymeric materials and/or methods of the present invention, including the preparation of reprocessable cross-linked polymers, as are available through the synthetic methodologies described herein. In comparison with the prior art, the present materials and methods provide results and data which are surprising, unexpected and contrary thereto. While the utility of this invention is illustrated through several polymeric materials and corresponding monomeric or polymeric reactants, radical initiator components and nitroxide components which can be used therewith, it will be understood by those skilled in the art that comparable results are obtainable with various other polymeric materials and reactants/initiators/nitroxide components, as are commensurate with the scope of this invention.

Materials and synthesis of network polymers. 2,2,6,6-tetramethyl-1-piperidinyloxy (TEMPO) methacrylate (98%) and 2,2,6,6-tetramethyl-4-piperidyl methacrylate (TMPM, 98%) were supplied by TCI America. Bifunctional initiator, 1,1-bis(tertbutylperoxy) cyclohexane (80 wt % solution), and 3-chloroperbenzoic acid (77%) were purchased from Sigma Aldrich. Monomers including styrene and n-butyl acrylate (nBA) were also purchased from Sigma Aldrich and deinhibited with corresponding inhibitor removers and $CaH_2$ provided by the same supplier. Toluene (Avantor, 99.7%), dimethylformamide (DMF) (Avantor, AR), dichloromethane (DCM) (Avantor, AR), tetrahydrofuran (THF) (Sigma Aldrich, 99.99%), anisole (Sigma Aldrich, 99%) were used as solvents. All chemicals were used as received.

Example 1

In a typical synthesis of a polymer network, 0.5 g TEMPO methacrylate, 3.33 g styrene, 3.33 g nBA (50-50 wt % styrene-nBA), and 0.3 mL 1,1-bis(tert-butylperoxy)cyclohexane solution were well mixed in a test tube and purged with nitrogen for 20 minutes before reacting at 120° C. Another composition with a lower styrene content, which contains 1.83 g styrene, 4.83 g nBA (25-75 wt % styrene-nBA), and same amounts of TEMPO methacrylate and bifunctional initiator above, was also used to produce elastomeric materials at room temperature. During the reaction, nitrogen atmosphere was maintained through continuous purging. After the color of the mixture changed from red to pale yellow, the viscous mixture was then poured into a petri dish sitting at 130° C. under argon atmosphere for further gelation. After 15 min annealing at 130° C., the gelation was achieved and a solid uniform film of the material was obtained. In order to remove the possible remaining monomers, a following annealing at 110° C. for 18 hr was performed with the obtained solid film. In the case of using low-cost alternative for high purity TEMPO methacrylate, 0.5 g TMPM and 0.5 g 3-chloroperbenzoic acid were pre-mixed in 20 mL dichloromethane and dried under 44° C. overnight and the resulting mixture was used to substitute the high purity TEMPO methacrylate while other procedures for the network polymer synthesis with TMPM+acid remain the same as that with high purity TEMPO methacrylate.

Example 2

Solubility and swelling test. Solubility tests of the as-synthesized solid polymer films were performed using various solvents, including THF, toluene, DMF, anisole, at 60° C. for 1 week. All the solid films showed swelling behavior in these solvents and they remained integrated as a whole film in the solvent throughout the test, indicating that the as-synthesized material is covalently crosslinked. The sol fraction of the as-synthesized crosslinked film was obtained by comparing the weight of the remaining polymer after swelling with that before swelling. For example, the sol fraction of the 50-50 wt % styrene-nBA synthesized with high purity TEMPO methacrylate was determined to be ~30 wt %.

Example 3

Reprocessing. As-synthesized materials were cut into millimeters-size pieces and hot pressed into ~0.8 mm-thick sheets at 130° C. with 5 tons force using a PHI press (model 0230C-X1). Different amounts of pressing time were applied for materials synthesized with different monomer compositions. For example, hot pressing at 130° C. for 45 min was found to be efficient for the 25-75 wt % styrene-nBA cross-linked samples to result in a relatively uniform recycled film, which can be considered as the first recycle material. The recycled film could be cut into small pieces and repressed for another 45 min again to form the second recycle material. The same procedure was performed to obtain samples with multiple recycles.

Example 4

Sample testing. Thermal and mechanical properties of the as-synthesized and reprocessed cross-linked materials were characterized by dynamic mechanical analysis (DMA), and tensile testing. For DMA testing, a TA Instruments 2980 dynamic mechanical analyzer operating in strain-controlled mode (0.02% strain) at a frequency of 2 Hz upon heating at 3° C./min was used to determine temperature-dependent E', E", and tan δ values. For tensile testing, a Sintech 20/g tensile tester equipped with a 250 N load cell and tensile testing grips was used. Dog-bone shaped samples were cut from as-synthesized or hot-pressed sheets. These samples were pulled vertically at 125 mm/min at a frequency of 300 Hz. The modulus, ultimate strength, and elongation at break were determined. A minimum of seven samples are tested for each formulation.

Example 5

Figure 4:
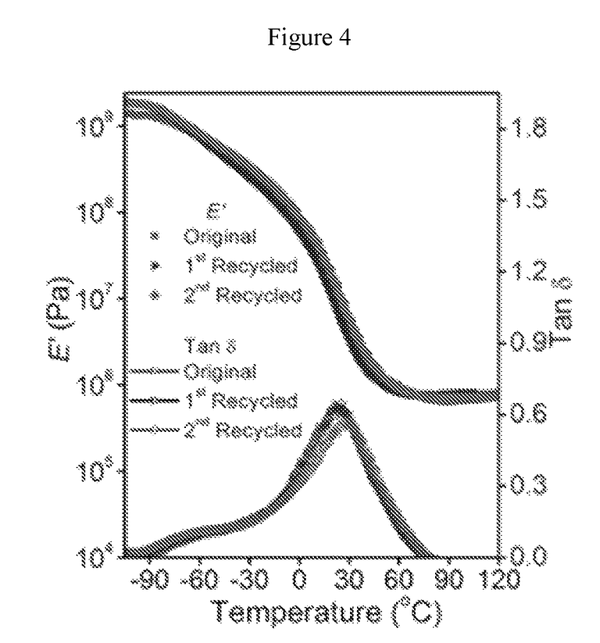
FIGS. 4-5. Dynamic mechanical responses (FIG. 4) of 43/57 wt % PB/S copolymer networks, E' (solid symbols) and tan δ (open symbols) as functions of temperature for original (squares), 1st recycled (triangles), and 2nd recycled (circles) samples. (One recycle corresponds to reprocessing at 140° C. for 40 min.) Procedures (FIG. 5) of synthesis and reprocessing of the cross-linked network polymers with dynamic alkoxyamine covalent bonds incorporated.

This invention can also be directed to reactant components which are homopolymers or copolymers that contain at least one carbon carbon double bond amenable to radical polymerization. Without limitation, such polymers can include low and/or high molecular weight polybutadiene, polyisoprene, styrene-butadiene copolymer, styrene-isoprene copolymer, etc. For instance, using 43 wt % low molecular weight polybutadiene (3 kg/mol) as a substitute for nBA, a polybutadiene (3 kg/mol)/styrene copolymer network can be obtained under the same experimental conditions used in Example 1. The cross-linking of the original polybutadiene (3 kg/mol)/styrene network is confirmed by its insolubility and swelling behavior in good solvents. After mechanical property testing, the original polybutadiene (3 kg/mol)/styrene network can be reprocessed at 140° C. in a compression mold and this reprocessing process can be repeated multiple times. The recycled samples remain cross-linked and exhibit insolubility and swelling behavior in good solvents. FIG. 4 shows that there is excellent reproduction of the temperature-dependent dynamic mechanical properties of the original cross-linked polybutadiene (3 kg/mol)/styrene network by the 1st and the 2nd recycled polybutadiene (3 kg/mol)/styrene networks. Excellent reproduction of room-temperature tensile properties is also observed in the 1st and 2nd recycling steps, as summarized in Table 2. These results indicate that the polybutadiene (3 kg/mol)/styrene networks obtained using the invented strategy exhibit full property retention within error after recycling multiple times.

TABLE 2

Tensile properties of recycled 43/57 wt % PB/S samples with sol fraction

| Tensile properties[a] | 1st recycle[b] | 2nd recycle |
|---|---|---|
| Young's modulus [MPa] | 21 (±5) | 22 (±6) |
| Elongation at break [%] | 136 (±9) | 113 (±14) |
| Tensile strength [MPa] | 3.6 (±0.6) | 3.6 (±0.4) |

[a]The reported errors for tensile properties are standard deviations from seven measurements.
[b]Each recycle corresponds to reprocessing at 140° C. for 40 min.

Example 6

Without limitation, this strategy can also be directed to high molecular weight polymers. For instance, 43 wt % high molecular weight polybutadiene (200 kg/mol) is used to provide a polybutadiene (200 kg/mol)/styrene network under the same experimental conditions used for Examples 1 and 5. The original polybutadiene (200 kg/mol)/styrene network can be reprocessed under similar conditions, maintaining network structures before and after recycling. As shown in Table 3, the same E' values (with error) can be observed in these recycled samples, demonstrating reprocessability and effective reformation of cross-links through 3 recycling steps in the polybutadiene (200 kg/mol)/styrene network. Without limitation, this strategy can also be directed to low and/or high molecular weight styrene-butadiene and copolymer copolymers.

TABLE 3

E' plateau value at 120° C. for recycled 43/57 wt % PB/S networks from 200 kg/mol PB (E' value for PB at 120° C. is 0.6 MPa)

| Tensile storage modulus[a] | 1st recycle[b] | 2nd recycle | 3rd recycle |
|---|---|---|---|
| E' [MPa] | 1.7 | 1.8 | 1.7 |

[a]Due to the presence of cross-links in the PB/S network, the E' value of the network is 3 times of that for pure 200 kg/mol polybutadiene. The same E' values (with error) observed in these recycled samples indicates the effective reformation of cross-links after recycling.
[b]Each recycle corresponds to reprocessing at 140° C. for 1 hr.

With reference to the preceding, but without limitation to any one theory or mode of operation, at reaction temperature of 120° C., bifunctional initiators quickly dissociate to produce bifunctional radicals, which can attack carbon carbon double bonds in either the styrene monomer or on each repeat unit of polybutadiene and form polymerizing chains with radical sites on both sides. The stable nitroxide radical incorporated in TEMPO methacrylate can reversibly can/uncap the polymerizing radicals; simultaneously, the carbon carbon double bond in TEMPO methacrylate can be attacked by the polymerizing radical and incorporated into a chain, with the stable radical dangling from the backbone and acting like a branch unit. At a critical conversion, polymerizing chains with radical sites on both sides can connect branch units together to result in a crosslinked PB/S rubber.

As demonstrated, this invention describes the design and synthesis of reorganizable or reprocessable cross-linked network polymers with alkoxyamine dynamic covalent bonds. In particular, the network is formed by controlled radical polymerization (nitroxide medicated polymerization) initiated by a multifunctional initiator, which is distinctly different from that formed by conventional free radical polymerization or by step-growth polymerization. Meanwhile, the choice of the functionality of the initiator can offer substantial tunability of the network topology that can be obtained. The synthesized crosslinked materials can be reprocessed or reshaped after curing without major reduction in mechanical properties through molecular reversible rearrangement reactions of alkoxyamine units in response to an external or environmental stimulus. In particular, this dynamic covalent chemistry can be applied with vinyl-based monomer systems, including styrene-butadiene and styrene-isoprene copolymeric systems used in the tire industry. Cross-linked materials with reprocessability are a part of a new class of materials between conventional thermosets and thermoplastics and potentially provide a solution to the challenge of "recyclable tires." More generally, this invention has the potential to be used for industrial production of a wide-range of reprocessable cross-linked elastomers and many other stimuli-responsive polymeric materials—due to its chemical simplicity, applicability to many readily-available monomers and relatively low cost, as compared to other approaches described in the literature.

We claim:
1. A crosslinked polymer material comprising
   a first reactant component comprising a carbon-carbon double bond amenable to radical polymerization;
   a second reactant component chemically distinct from the first reactant component, the second reactant component comprising a carbon-carbon double bond amenable to radical polymerization;
   a nitroxide monomeric component comprising a carbon-carbon double bond amenable to radical polymerization and a nitroxide moiety; and a multifunctional radical initiator component chemically distinct from the nitroxide monomeric component, wherein the multifunctional radical initiator component initiates radical polymerization of the first reactant component, the second reactant component, and the nitroxide monomeric component at respective carbon-carbon double bonds to form polymer chains which incorporate the first reactant component, the second reactant component, the nitroxide monomeric component and the multifunctional radical initiator component, each polymer chain further comprising at least one radical site and the nitroxide moiety as a branching unit;

wherein the polymer chains are crosslinked to one another via a reversible alkoxyamine (C—O—N) covalent bond formed by a reaction of the nitroxide moiety of one of the polymer chains with the radical site of another of the polymer chains, thereby providing the crosslinked polymer material.

2. The crosslinked polymer material of claim 1, wherein said first reactant component has formula $R_1R_2CCR_3R_4$, where each of $R_1$-$R_4$ is independently selected from H, halo, alkyl, haloalkyl, aryl, substituted aryl, arylalkyl, substituted arylalkyl, alkenyl, haloalkenyl, arylalkenyl, substituted arylalkenyl, alkoxycarbonyl and alkylaminecarbonyl moieties, said substituents selected from halo, alkyl and haloalkyl substituents and combinations thereof.

3. The crosslinked polymer material of claim 2, wherein said first reactant component is a first vinyl component having formula $CH_2CHR_1$.

4. The crosslinked polymer material of claim 3, wherein said first vinyl component is an arylethylene.

5. The crosslinked polymer material of claim 4, wherein said first vinyl component is styrene.

6. The crosslinked polymer material of claim 2, wherein said second reactant component is selected from a polymer and a copolymer.

7. The crosslinked polymer material of claim 6, wherein said second reactant component is selected from polybutadiene, polyisoprene, styrene-butadiene copolymer and styrene-isoprene copolymer.

8. The crosslinked polymer material of claim 2, wherein said second reactant component is a second vinyl component having formula $CH_2CHR_5$, wherein $R_5$ is selected from H, halo, alkyl, haloalkyl, aryl, substituted aryl, arylalkyl, substituted arylalkyl, alkoxycarbonyl and alkylamine carbonyl moieties, said substituents selected from halo, alkyl and haloalkyl substituents and combinations thereof.

9. The crosslinked polymer material of claim 8, wherein $R_5$ is an alkoxycarbonyl.

10. The crosslinked polymer material of claim 9, wherein said second vinyl component is n-butyl acrylate.

11. The crosslinked polymer material of claim 1, wherein said multi-functional radical initiator component is a degradation product of a peroxy compound.

12. The crosslinked polymer material of claim 11, wherein said peroxy compound is selected from bis-alkylperoxyalkyl and bis-alkylperoxycycloalkyl compounds and combinations thereof.

13. The crosslinked polymer material of claim 1, wherein the nitroxide monomeric component is 2,2,6,6-tetramethyl-1-piperidinyloxy methyacrylate.

14. The crosslinked polymer material of claim 1, wherein the first reactant component is a first vinyl component, the second reactant component is a second vinyl component, and the multi-functional radical initiator component is a degradation product of a peroxy compound.

15. The crosslinked polymer material of claim 14, wherein the peroxy compound is selected from bis-alkylperoxyalkyl and bis-alkylperoxycycloalkyl compounds and combinations thereof and the nitroxide monomeric component is 2,2,6,6-tetramethyl-1-piperidinyloxy methyacrylate.

16. The crosslinked polymer material of claim 15, wherein the first vinyl component is styrene and the second vinyl component is n-butyl acrylate.

17. The crosslinked polymer material of claim 1, wherein the first reactant component is a first vinyl component, the second reactant component is a polymer or a copolymer, and the multi-functional radical initiator component is a degradation product of a peroxy compound.

18. The crosslinked polymer material of claim 17, wherein the peroxy compound is selected from bis-alkylperoxyalkyl and bis-alkylperoxycycloalkyl compounds and combinations thereof and the nitroxide monomeric component is 2,2,6,6-tetramethyl-1-piperidinyloxy methyacrylate.

19. The crosslinked polymer material of claim 18, wherein the first vinyl component is styrene and the second reactant component is polybutadiene.

20. The crosslinked polymer material of claim 1, having a three-arms crosslinked topology wherein each arm of the three-arms corresponds to one of the polymer chains having incorporated therein, the first reactant component, the second reactant component, the nitroxide monomeric component, and the multifunctional radical initiator component; and wherein each arm of the three arms is connected to, and extends from, the nitroxide monomeric component of one of the polymer chains.

21. The crosslinked polymer material of claim 1, comprising a single type of nitroxide monomeric component.

* * * * *